Sept. 4, 1951  W. A. MEIER  2,566,350
METHOD OF FLAME POLISHING THE GRAY CUT
SURFACE OF ORNAMENTAL DESIGNS IN GLASS
Filed Sept. 4, 1947
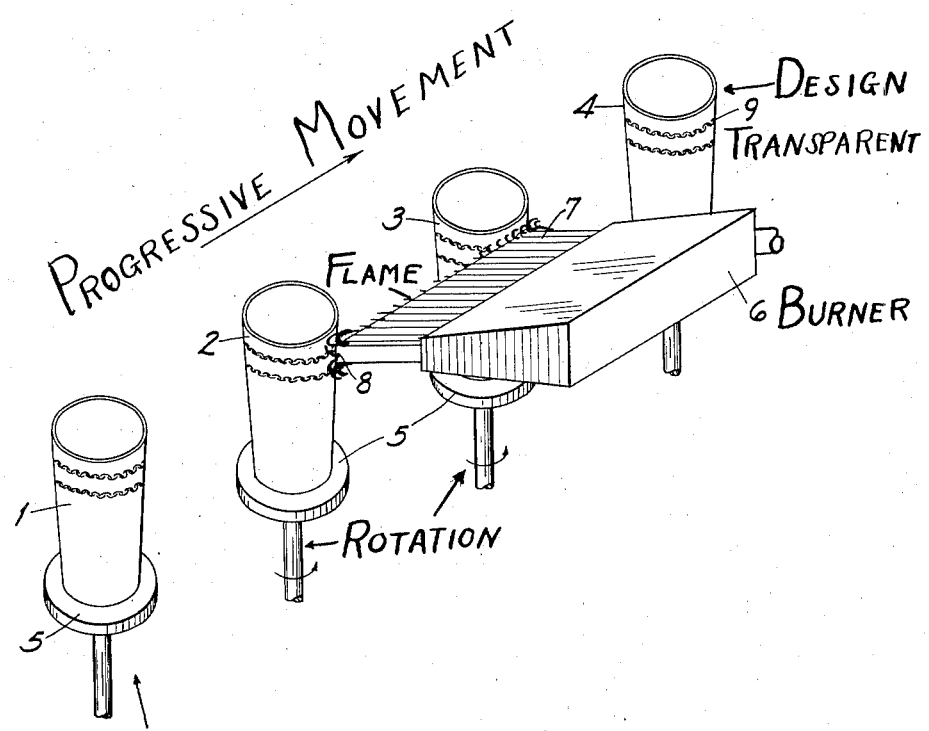
INVENTOR.
William A. Meier
BY
His Attorney.

Patented Sept. 4, 1951

2,566,350

UNITED STATES PATENT OFFICE 2,566,350

METHOD OF FLAME POLISHING THE GRAY CUT SURFACE OF ORNAMENTAL DESIGNS IN GLASS

William A. Meier, Rochester, Pa.

Application September 4, 1947, Serial No. 772,225

1 Claim. (Cl. 49—77)

This invention relates generally to a method of polishing the gray surface of cut glass and more particularly to a method of polishing the gray surface irregularities that result from the cutting of glass by heating said surface to a temperature sufficient to melt the finite irregularities causing them to flow to thereby eliminate the surface irregularities and produce a transparent surface on the glass.

The cut surface of glass may be a marginal or decorative cut or series of cuts formed by the use of an abrasive wheel or hand tool. The abrasive substance may be in the form of a stone or a ceramic tool made up of abrasive grit bonded together by a ceramic or plastic material. Other suitable abrasive tools employing minerals or metals, such as a steel or copper wheel, are frequently employed for cutting the surface of glass. The solid metal wheels are ordinarily employed in cutting designs and the like in glass table ware. The ceramic or plastic bonded grinding tools are constructed so that the binder breaks free in order to expose the sharp grit or other abrasive particles which they cement together thereby permitting the abrasive to freely cut the glass with the best efficiency. These small grit particles leave their finite scratches on the surface of the glass which surface irregularities leave a diffused or sand blasted appearance known as gray cut glass. A similar surface is also produced by the solid metal grinding wheels.

The cutting or grinding of glass is ordinarily supplemented by the use of a lubricant such as water or a liquid fixture. These lubricants frequently function as a carrier for fine abrasive powder. Regardless of the manner or character of tool employed in cutting the surface of glass the cut surface invariably leaves a myriad of finite scratches leaving many fine irregularities providing a gray appearance and creating a translucent condition on transparent glass. It is impossible to cut glass without leaving tool marks of this character on the surface of the glass and the surface is generally referred to in the art as a gray cut surface which extends across the full face of the cut and into the deepest groove as well as in the small delicate lines making up a design.

In order to eliminate the gray cut surface and make the article truly transparent the industry follows the present practice of polishing the gray cut surface by either buffing the same with either a wooden or cork wheel supplemented by a rouge polished paste or by dipping the gray cut surface into a bath of hydrofluoric acid which attacks the surface irregularities and literally eats away the finite protrusions giving it the effect of a fairly clear and uniform surface. It is exceedingly difficult to polish the fine lines of a design in cut glass by means of a wooden or cork wheel and upon close inspection the slightest hesitation by the artisan produces a noticable burnished surface on the cut which is apt to alter the design. However, in the case of polishing the beveled edge of plate glass, the machine may be made to accurately polish the same and produce a uniformly finished surface. The buffing or mechanical polishing of cut glass requires a considerable time and it materially increases the cost of the article.

The principal object of this invention is the provision of a method for polishing the gray cut or ground surface in glass by the use of heat. This process materially reduces the time and the cost of converting a gray cut surface into a transparent surface.

Another object is the provision of the method of heating a gray cut surface of glass to a temperature sufficient to melt and flow the finite scratches forming surface irregularities into a uniform surface and thereby eliminate the gray cast and produce a transparent polished surface at relatively low cost and in a relatively short period of time.

Another object is the provision of a method of flame polishing the surface irregularities of a gray cut glass by direct flame impingement on the gray cut surface with a flame of sufficient temperature to melt the surface irregularities and flow them into a uniform transpart surface having the characteristics of a polished surface of glass.

Another object is the provision of the method steps of heat polishing the gray surface of cut glass and annealing the glass to remove the strains therefrom.

Another object is the provision of the method steps of heat polishing the gray surface of cut glass by pre-heating the glass, applying localized heat to melt and flow the surface irregularities of the gray cut glass, and annealing the glass to remove the strains created by the localized heating.

Another object is the provision of a method of polishing the surface irregularities of gray cut glass by moving said surface through a flame which melts and flows the surface irregularities into a uniform transparent surface.

Another object is the provision of the method steps of heat polishing the gray cut glass surface by rotating the same in direct flame impingement while simultaneously progressively moving the same until the surface is heated sufficiently to melt and flow the surface irregularities into a polished transparent surface.

Other objects and advantages appear in the following description and claims.

The accompanying drawing shows for the purpose of exemplification without limiting the invention thereto an isometric view of glass ware at room temperature having an ornamental design cut thereon and being progressively moved and rotated as it passes along in direct contact with a flame which polishes the gray cut surface to transparency.

Gray cut surface on glass is made up of a myriad of finite scratches having rough edges which surface irregularities diffuse light striking the glass and cause it to have a gray appearance that is translucent. Such surfaces may be observed on unpolished designs on cut glass, unpolished beveled edges of plate glass, on sandblasted glass, or on the ground surface of glass such as observed on bottle stoppers and necks. The application of heat to a surface of this character, which heat is of sufficient intensity to melt these surface irregularities, will cause them to flow together and reproduce a transparent surface in the cut or on the ground portion of the glass. If the glass is relatively thin, such as a goblet, these surface irregularities may be heated to a temperature sufficient to cause them to melt and flow in a relatively short time as compared to the time required to heat polish the gray cut surface of a heavier piece of glass, such as a thick-walled tumbler or plate glass. The temperature of the heat applied of course must be selected in accordance with the composition of the glass. In other words, a very hard glass will obviously require a higher temperature to melt and flow the surface irregularities than that of a soft glass such as a lead glass. Again, the temperature of the heat applied for polishing the gray surface of cut or ground glass must be sufficiently low to prevent the body of the glass from melting or changing its shape due to the application of heat.

It has been found that by applying the heat to a glass article that may be rotated, it is advantageous to apply the heat only to one side of the glass while the article turns. In this manner a higher temperature heat application or flame may be employed to heat polish the gray surface of the cut or ground glass. In order to convert this method into a continuous process the rotating glass article may be progressively moved while heat is being applied thereto which has been found to satisfactorily perform heat polishing of the surface irregularities. However, a heat of lower temperature may be employed to produce the same result if it is continuously applied to the gray cut surface in which case the article need not be rotated as the whole of the gray surface would then be heated simultaneously.

By rotating the article with the gray cut or ground surface having the heat applied to one side thereof, that portion of the article that is remote of the application of heat has an opportunity to slightly cool before it again has the heat applied thereto. This provides each portion of the gray cut surface with alternate periods of a gradual increasing heat to a maximum temperature and then decreasing to a minimum temperature as the article rotates, which period is then followed by a period of cooling before the article turns to the position where heat is again applied to the gray cut surface. This character of heat application prevents continued high concentrated heat that may crack the glass in a manner similar to that employed in cutting off such glass by the application of concentrated heat coupled with scoring.

Heat may be applied by the use of any desired character of fluid fuel producing a flame from a liquid or gaseous fuel wherein the heat is derived by the direct application of flame to the gray cut surface, which process would be termed flame polishing. However, the heat may also be derived from other sources such as an indirect application of heat through a heat element or by means of a high frequency oscillating circuit which will perform the function of melting the surface irregularities and cause them to flow into a uniform transparent surface without injuring the body of the glass or changing the contour of the cut surface.

It has been found that some ware may be heat polished by subjecting it to the heat application when the ware is at room temperature without injuring or otherwise destroying the article. This is particularly true of ware such as a heavy tumbler wherein the gray cut surface is somewhat remote of the thick base. However, such an application of concentrated heat will of course produce strains in the ware which strains have been found to be uniformly distributed in the ware and may be readily removed by annealing the same in a lehr which gradually increases the temperature of the ware to a maximum annealing temperature and subsequently cooling by causing a uniform reduction of temperature until the ware reaches a room temperature as it passes out of the lehr.

When the ware has a gray cut or ground surface adjacent to a heavy body of glass or a changing thickness in the glass, being characteristic of that of stemware, it is found to be advisable to pre-heat the ware to a temperature of ⅓ to ½ the temperature of the heat applied to polish the gray cut or ground surface so that the ware is not subjected to a severe shock when the polishing heat is applied thereto. This pre-heating step thus lends itself to a continuous process for heat polishing which consists in the steps of continuously moving the ware through a pre-heating zone, at the end of which the ware is immediately transferred to a position where it may be rotated as it is continuously moved along with a direct heat application for polishing the gray surface, after which polishing period the ware is immediately transferred to a lehr where it moves through an annealing period from which it emerges at room temperature. This process has been found to properly treat the ware for heat polishing the gray cut or ground surface thereon with substantially no loss in the articles subjected to the process.

It is preferred that the articles being presented to the heat polishing process be selected so that the heat is applied to the full width or height of the gray cut or ground surface. Thus, in some instances, the heat is applied in bands or zones which may extend for the full height or length of the gray cut surface. The zone or band of heat should then be varied in accordance with the height of the gray cut surface and the heat source should also be shaped to provide a substantially uniform distance between source of heat and the gray cut or ground surface. In carrying out this process by the use of a flame it may be desirable to provide burners the multiport faces of which follow somewhat the contour of the article to properly and uniformly apply the heat concentration in the band of zone as the article is rotated and moved progressively along with the gray cut surface receiving the direct impingement of the flame.

The drawing illustrates a series of glass tumblers 1 to 4 seated on the supports 5 which are caused to rotate while passing along under the burner 6 in a manner similar to that disclosed in the Letters Patent to A. B. Knight, 1,577,581. The burner 6 has a continuous flame 7 issuing therefrom. The width of the flame at the glass ware corresponds to the width of the gray cut surface design as indicated at 8. The glass ware is at room temperature when it reaches the flame 7 and progressively moves, while rotating, with direct impingement of the flame until the gray cut surface becomes transparent as indicated at 9 on the glass tumbler 4.

It has been found that the process of heat polishing the gray cut or ground surface of glass by this method has reduced the cost of the article approximately eight times of that of the present mechanical buffing and acid polishing processes which are practiced in the art at the present time, which is a material advancement in the art.

I claim:

The continuous process of polishing the finite irregularities making up the translucent gray cut surface of an ornamental design on glass ware which consists in providing a controlled flame along a continuous path and of sufficient heat intensity to melt the finite parts making up the gray cut surface and of a width corresponding to the width of the gray cut surface of the design, introducing and progressively moving the glass ware at room temperature along the continuous path in direct impingement of the flame at the full width only of the gray cut surface of the ornamental design, rotating the glass ware while progressively so moving it through the flame, retaining the glass ware along its progressive rotary movement in direct impingement of the flame for a sufficient length of time only to melt the finite parts making up the gray cut surface of the ornamental design to polish it transparent, whereby the ornamental portions of the article are flame polished without materially heating the remainder of the glass ware.

WILLIAM A. MEIER.

REFERENCES CITED

The following references are of record in the file of this patent:

UNITED STATES PATENTS

| Number | Name | Date |
| --- | --- | --- |
| 772,902 | Nolan | Oct. 18, 1904 |
| 1,178,256 | Miller | Apr. 4, 1916 |
| 1,577,581 | Knight | Mar. 23, 1926 |
| 1,667,146 | Drake | Apr. 24, 1928 |
| 2,044,566 | Cory | June 16, 1936 |
| 2,073,144 | Darrah | Mar. 9, 1937 |
| 2,371,486 | Walker | Mar. 13, 1945 |
| 2,507,433 | Borchert et al. | May 9, 1950 |